United States Patent
Hsu et al.

US006211305B1

(10) Patent No.: US 6,211,305 B1
(45) Date of Patent: Apr. 3, 2001

(54) AROMATIC POLYOL END-CAPPED UNSATURATED POLYETHERESTER RESINS AND RESIN COMPOSITIONS CONTAINING THE SAME HAVING IMPROVED CHEMICAL AND/OR WATER RESISTANCE

(75) Inventors: Chih-Pin Hsu; Ming Yang Zhao; Linda Bergstrom, all of Kansas City, MO (US)

(73) Assignee: Cook Composites and Polymers Co., North Kansas City, MO (US)

(*) Notice: Subject to any disclaimer, the term of this patent is extended or adjusted under 35 U.S.C. 154(b) by 0 days.

(21) Appl. No.: 09/232,989

(22) Filed: Jan. 19, 1999

Related U.S. Application Data

(60) Provisional application No. 60/071,951, filed on Jan. 20, 1998.

(51) Int. Cl.[7] .......................... C08G 63/91; C08G 63/676
(52) U.S. Cl. .......................... 525/442; 525/42; 525/445; 525/447
(58) Field of Search .......................... 525/447, 445, 525/442, 42

(56) References Cited

U.S. PATENT DOCUMENTS

| | | | |
|---|---|---|---|
| 3,347,806 | 10/1967 | Zimmermann et al. | 260/22 |
| 3,701,748 | 10/1972 | Kroekel | 260/40 |
| 3,883,612 | 5/1975 | Pratt et al. | 260/862 |
| 3,933,757 | 1/1976 | Pratt et al. | 260/75 A |
| 3,986,922 | 10/1976 | Parker et al. | 162/5 |
| 4,029,848 | 6/1977 | Nelson | 428/430 |
| 4,148,765 | 4/1979 | Nelson | 260/22 |
| 4,246,367 | 1/1981 | Curtis, Jr. | 525/49 |
| 4,295,907 | 10/1981 | Cordts et al. | 156/246 |
| 4,348,499 | 9/1982 | Nelson | 525/49 |
| 4,477,325 | 10/1984 | Osburn | 204/159.12 |
| 4,480,077 | 10/1984 | Hefner, Jr. | 525/530 |
| 4,525,544 | 6/1985 | Nelson et al. | 525/531 |
| 4,724,173 | 2/1988 | Rockett et al. | 427/389.8 |
| 4,959,259 | 9/1990 | Guilbaud | 428/215 |
| 5,254,723 | 10/1993 | Yang et al. | 560/240 |
| 5,319,006 | 6/1994 | Yang et al. | 523/500 |
| 5,436,313 | 7/1995 | Klang et al. | 528/274 |
| 5,436,314 | 7/1995 | Yang et al. | 528/274 |
| 5,637,630 | 6/1997 | Atkins | 523/523 |
| 5,674,970 | 10/1997 | Hutchings et al. | 528/205 |

FOREIGN PATENT DOCUMENTS

| | | | |
|---|---|---|---|
| 0 186 165 A2 | 7/1986 | (EP) | C08L/67/06 |
| 0 755 976 A1 | 1/1997 | (EP) | C08L/67/06 |
| 97/31965 | 9/1997 | (WO) | C08G/63/676 |

OTHER PUBLICATIONS

Lubin, G., *Handbook of Composites* p. 59, Van Nostrand Reinhold Co. 1982.*

* cited by examiner

*Primary Examiner*—Patricia A. Short
(74) *Attorney, Agent, or Firm*—Whyte Hirschboeck Dudek SC

(57) ABSTRACT

Unsaturated polyetherester resins, and processes for making them, are described which are useful for making curable thermoset resin compositions, intermediates for curable thermoset resin compositions, fiber-reinforced polymer composites, intermediates for making skin laminates for gel coated fiber-reinforced composites and gel coated polymer laminates. The unsaturated polyetherester resins are obtainable by reacting at least one acid-terminated unsaturated polyetherester resin with at least one aromatic polyol having at least one non-primary hydroxy group to produce an unsaturated polyetherester resin at least partially end-capped with an aromatic polyol. The described processes, compositions, methods and uses improve the chemical and/or water resistance of resin compositions, particularly composite materials having a gel coat. That improvement has special significance in outdoor and marine applications, bathtubs and shower stalls, and environments exposed to chemicals such as industrial and commercial applications.

18 Claims, No Drawings

AROMATIC POLYOL END-CAPPED UNSATURATED POLYETHERESTER RESINS AND RESIN COMPOSITIONS CONTAINING THE SAME HAVING IMPROVED CHEMICAL AND/OR WATER RESISTANCE

This application claims the benefit of U.S. Provisional Application Ser. No. 60/071,951, filed Jan. 20, 1998.

BACKGROUND OF THE INVENTION

1. Field of the Invention

This invention pertains to the field of polymer resins, curable thermoset resins, resin systems which include curable thermoset resins, composite materials and skin laminates for composite materials, and processes and intermediates for making the same.

2. Description of Related Art

Known gel coated fiber-reinforced polymers are subject to blistering if immersed in water or solvents for a prolonged period of time unless special measures are taken to prevent this phenomenon. Blisters are raised by localized swelling of the gel coated laminate due to diffusion of water into the composite and the presence of water-soluble constituents within the laminate. The blisters not only effect the external appearance of the gel coated fiber-reinforced polymer article, but also eventually lead to reduced composite strength.

Several methods have been proposed to reduce blistering in gel coated composite materials. U.S. Pat. No. 4,724,173 describes using a permeable gel coat to allow the osmotically active molecules to diffuse from the osmotic centers through the gel coat at a defined transport rate whereby the osmotic pressure of the osmotic centers is reduced so as to reduce blistering. U.S. Pat. No. 4,477,325 describes a method of manufacturing a skin barrier which has improved water resistance to protect the composite material from hydrolysis. U.S. Pat. Nos. 4,480,077 and 4,525,544 describe vinyl ester resin compositions which may be used in the laminate construction to impart greater resistance to water permeation and U.S. Pat. No. 4,959,259 describes a bisphenolic polyester resin composition which may also be used to impart greater water permeation resistance.

The latter technique, using a laminate resin having greater corrosion and/or water resistance, is the most common technique used by the composite industry to reduce blistering. Those resins are typically vinyl ester resins or isophthalic polyester resins. Not only is that technique not always completely successful, it also increases the overall expense of the composite material and/or reduces the flexibility in choosing the laminating resin for other desired properties.

For these and other reasons, further improvements in the ability to prevent blistering are desired. These improvements have special significance in outdoor and marine applications, bathtubs and shower stalls and environments exposed to chemicals, such as industrial and commercial applications. These and other objectives are achieved by the present invention.

SUMMARY OF THE INVENTION

One aspect of this invention is a process for making unsaturated polyetherester resins that are useful for making curable thermoset resin compositions comprising reacting at least one acid-terminated unsaturated polyetherester resin with at least one aromatic polyol having at least one non-primary hydroxy group to produce an unsaturated polyetherester resin at least partially end-capped with an aromatic polyol. The aromatic polyol end-capped unsaturated polyetherester resins obtainable by that process are also part of this invention.

Another aspect of this invention is curable thermoset resin compositions useful for imparting water and/or solvent resistance to gel coated fiber-reinforced polymers comprising:
(A) At least 5 wt. % of at least one aromatic polyol end-capped unsaturated polyetherester resin according to this invention;
(B) At least one unsaturated polyester resin having a number average molecular weight to the average number of double bonds per polymer molecule in the range from about 200 to about 400, in an amount such that the weight ratio of polyester resin (B) to polyetherester resin (A) is in the range from about 10:90 to about 90:10;
(C) About 10 to about 70 wt. % of at least one vinyl monomer; and
(D) At least one curing agent,
and intermediates for making such curable thermoset resin compositions comprising all the components of the curable thermoset resin composition except the at least one curing agent (D).

Two more aspects of this invention are fiber-reinforced polymer composites obtainable by combining the curable thermoset resin composition according to this invention with reinforcing fiber and curing the curable thermoset resin composition and gel coated fiber-reinforced polymers comprising such fiber-reinforced compositions and a gel coat.

Yet another aspect of this invention is intermediates for making skin laminates for gel-coated fiber-reinforced composites, the intermediates comprising reinforcing fibers and the curable thermoset resin composition according to this invention in the form of a sheet.

A further aspect of this invention is gel coated polymer laminates comprising at least one fiber-reinforced polymer layer, at least one gel coat layer, and at least one thermoset resin layer interposed between the at least one fiber-reinforced polymer layer and the at least one gel coat layer, wherein the at least one thermoset resin layer is obtainable by applying the curable thermoset resin composition or the skin laminate intermediate according to this invention as a barrier layer between the gel coat layer and the fiber-reinforced polymer layer and curing the curable thermoset resin composition.

Two further aspects of this invention are methods for making a curable thermoset resin composition comprising combining:
(A) At least 5 wt. % of at least one unsaturated polyetherester resin according to this invention;
(B) At least one unsaturated polyester resin having a number average molecular weight to the average number of double bonds per polymer molecule in the range from about 200 to about 400, in an amount such that the weight ratio of polyester resin (B) to polyetherester resin (A) is in the range from about 10:90 to about 90:10;
(C) About 10 to about 70 wt. % of at least one vinyl monomer; and
(D) At least one curing agent.

Two further aspects of this invention are methods for reducing blistering of a gel coated fiber-reinforced polymer comprising:
(1) Applying at least one layer of the curable thermoset resin composition or the skin laminate intermediate of this invention between a gel coat layer and a fiber-reinforced polymer layer and (2) Curing the curable thermoset resin composition, and articles obtainable by such methods.

The invention is described in further detail below.

DETAILED DESCRIPTION OF THE INVENTION

Definitions

The term "unsaturated polyetherester resin" means polymer resins of intermediate molecular weight that contain ethylenic unsaturation available for free-radical polymerization with a vinyl monomer, recurring ester units, and recurring polyether blocks. The polyether blocks have repeat units of oxyalkylene groups (-O-alkylene-). They have carboxylic acid end groups which react with at least one of the end-capping compounds.

The terms "hydrocarbyl", "hydrocarbylene" and "hydrocarbylidene" each refer to a moiety made up of carbon and hydrogen atoms, and optionally up to 10 percent of the total number of atoms in this moiety of other covalently bonded atoms (i.e., covalently bonded hetero atoms, such as atoms of oxygen, sulfur, etc.). The moiety may, for example, contain oxygen and/or sulfur atoms as ether or ester linkages. The term "hydrocarbyl" refers to such a moiety with a valence of one, and both "hydrocarbylene" and "hydrocarbylidene" refer to such a moiety having a valence of two. The term "hydrocarbylidene" refers to such a moiety in which both valences (i.e., both bonds to the remainder of the molecule to which it is bonded) are on the same carbon atom. When these terms are preceded by the term "predominantly" such as "predominantly hydrocarbylene", that indicates that the moiety may have up to, but not including, 50 percent based on the total number atoms in the moiety of the other covalently bonded atoms described above.

Examples of hydrocarbyl, hydrocarbylene and hydrocarbylidene (cumulatively referred to herein as "hydrocarb(yl/ylene/ylidene") groups include, but are not limited to, aliphatic groups, such as straight and branched alkyl groups, having up to 12, more preferably up to 8, and even more preferably up to 4 carbon atoms and a minimum of 1, more preferably at least 2, carbon atoms, such as an ethylene, a propylene or a butylene group, preferably a propylene group; the aforementioned aliphatic groups having one or more pendant hydrocarbyl groups, including aromatic groups as well as aliphatic groups; cycloaliphatic groups having from 5 to 7 carbon atoms; heterocyclic groups having from 5 to 7 ring atoms in which at least half the atoms in the ring are carbon atoms and the hetero atoms may be selected from any of the aforementioned hetero atoms; aromatic groups; and polymers comprising these hydrocarbyl groups interrupted by hetero atoms or hetero groups, such as ether and/or ester groups, preferably ether groups. A "nonaromatic hydrocarb(yl/ylene/ylidene)" group is one which does not contain any aromatic groups.

An "aromatic group" is any covalently bonded group of atoms in which the majority of atoms are members of at least one aromatic ring. The aromatic group preferably has up to 3, more preferably up to 1, aromatic ring(s) and preferably at least 80, more preferably at least 90, percent of the atoms in the aromatic group are members of an aromatic ring. Examples include benzene, naphthalene, etc., rings, which may optionally have substituents such as hydrocarbyl groups, functional groups containing hetero atoms, and hetero atoms, and such rings fused with each other or linked to each other directly or indirectly via covalent bonds. When the aromatic group is a bridging group between two or more parts of the same molecule, each bond to the aromatic group is preferably attached directly to an atom which is a member of an aromatic ring of the aromatic group.

An "aromatic polyol" is an aromatic group having at least two nonphenolic hydroxy groups. Nonphenolic hydroxy groups are hydroxy groups that are not directly bonded to an aromatic ring, but are indirectly bonded to an aromatic ring via an atom or group of atoms that are not members of an aromatic ring. The atom or group of atoms are preferably a predominantly hydrocarbylene or hydrocarbylidene group. Aromatic polyols useful in this invention are described in more detail under the Detailed Description of the Invention.

A "nonprimary hydroxy group" is a hydroxy group attached to a carbon atom which has more than one carbon atom bonded covalently directly to it, but which is not an aromatic ring member. A "secondary hydroxy group" is a hydroxy group attached to a secondary carbon atom, which is a carbon atom that has two carbon atoms bonded covalently directly to it but which is not an aromatic ring member. A "tertiary hydroxy group" is a hydroxy group attached to a tertiary carbon atom, which is a carbon atom that has three carbon atoms bonded covalently directly to it but which is not an aromatic ring member.

An ether linkage is a moiety of the formula —O— or —S—. An ester linkage is a moiety of the formula —C(O)O— or —O(O)C—, or the corresponding moieties in which sulfur atoms are substituted for one or both oxygen atoms.

The terms "curing" and "cured" refer to the formation of a substantially irreversible three-dimensional crosslinking network in a curable polymer composition such that the polymer forms a structure that is substantially insoluble in solvents for the uncrosslinked polymer.

The term "bisphenol-A" refers to 2,2-bis(4-hydroxyphenylpropane).

Unless otherwise specified herein, the term "viscosity" refers to the viscosity of a polymer in styrene monomer at 65 wt. % NVM (non-volatile material, see below) at 25 C measured using a Brookfield Viscometer.

The term "NVM" refers to non-volatile material (a.k.a. "solids") dispersed in a volatile substance (e.g., styrene monomer) measured according to ASTM D1259.

The term "ASTM" refers to a well known collection of standard laboratory procedures for measuring the properties of materials published by the American Society for Testing and Materials.

Unless specified otherwise, all ratios, percentages, and parts are by weight.

A more detailed description of the aromatic polyol end-capped unsaturated polyetherester resins and the curable thermoset resin compositions, and the corresponding methods of making and using them, of this invention follows.

Aromatic Polyol End-Capped Unsaturated Polyetherester Resin

The aromatic polyol end-capped unsaturated polyetherester resins of this invention are obtainable by a process comprising reacting at least one acid-terminated unsaturated polyetherester resin with at least one aromatic polyol having at least one non-primary hydroxy group, preferably at least one secondary hydroxy group, to produce an unsaturated polyetherester resin at least partially end-capped with an aromatic polyol.

Suitable acid-terminated unsaturated polyetherester resins for making the corresponding end-capped resins include the reaction products of polyethers and unsaturated carboxylic anhydrides or unsaturated di-or polycarboxylic acids. Preferred polyethers include polyether polyols, such as polyoxyalkylene polyols, alkylene oxide-alkylene oxide copolymers, and the like, in which the alkylene group preferably has from 2 to 6 carbon atoms (for example, polyoxypropylene polyols, polyoxyethylene polyols, ethylene oxidepropylene oxide copolymers, etc.). These polyols preferably have average hydroxyl functionality in the range from about 2 to about 8 and preferably have a number average molecular weight in the range from about 250 to about 10,000. The unsaturated anhydrides are preferably cyclic anhydrides, such as maleic anhydride, succinic anhydride, phthalic anhydride, and the like. Preferred unsaturated di-or polycarboxylic acids include linear, branched, and cyclic $C_3$–$C_{40}$ dicarboxylic acids and $C_8$–$C_{40}$ aromatic dicarboxylic acids, such as maleic acid, fumaric acid, phthalic acid and isophthalic acid.

This reaction is conducted under reaction conditions that assure that at least some of the unsaturated polyetherester is acid-terminated, which can be determined by one of ordinary skill in this field. One skilled in the art would know how to adjust the reaction conditions, such as the ratio of the number of equivalents of the acid reactant(s) to the number of equivalents of the polyol reactant(s) to obtain an unsaturated polyetherester resin product with acid-terminated polymer chains. The ratio of equivalents of acid reactant(s) to polyol reactant(s) is preferably at least about 0.7:1., more preferably at least about 0.9:1, and even more preferably at least about 1:1.

The oxyalkylene repeat units of the preferred unsaturated polyetherester resins have from 2 to 10 carbon atoms each (e.g., oxypropylene, oxyethylene, etc.), more preferably from 2 to 4 carbon atoms. Preferably, the unsaturated polyetherester resins have an ether/ester mole ratio of at least about 0.75, more preferably at least about 1 and preferably not greater than about 3. The number average molecular weight of these resins is preferably in the range from about 500 to about 10,000.

U.S. Pat. No. 5,319,006, which is incorporated herein by reference, describes one process for making the unsaturated polyetherester resins in which the polyether is reacted with a cyclic unsaturated carboxylic anhydride in the presence of a Lewis acid catalyst.

U.S. Pat. Nos. 5,436,313 and 5,436,314, also incorporated herein by reference, describe preferred methods for preparing the unsaturated polyetherester resins in which the catalyst for inserting anhydrides and dicarboxylic acids into the polyethers are protic acids having a pKa less than about 0 and metal salts thereof.

The above-described acid-terminated unsaturated polyetherester resin is, according to the process of making the aromatic polyol end-capped product of this invention, reacted with at least one aromatic polyol. The reaction lowers the acid number of the acid-terminated unsaturated polyetherester resin relative to the acid number of the same prior to the reaction. Preferably, the acid number of the unsaturated polyetherester resin is decreased by at least 50 percent via the reaction with the aromatic polyol. In a preferred embodiment, the amount of the at least one aromatic polyol reacted with the acid-terminated unsaturated polyetherester resin is at least about 5, more preferably at least about 10, up to about 50, wt. % based on the total weight of the starting reaction mixture.

Aromatic polyols suitable for reacting with the acid-terminated unsaturated polyetherester resin to make the aromatic polyol end-capped product of this invention has at least one nonprimary hydroxy group as one of the polyol hydroxy groups. The aromatic polyol can have multiple nonprimary hydroxy groups. The nonprimary hydroxy groups may be secondary and tertiary hydroxy groups, but are preferably secondary hydroxy groups. Preferably, the aromatic polyol also has at least one primary hydroxy group as one of the polyol hydroxy groups to increase the overall reaction rate between the aromatic polyol and the acid-terminated unsaturated polyetherester. A wide range of aromatic polyols are suitable as the reactant(s) with the unsaturated polyetherester resin.

In a preferred embodiment, the aromatic polyol may be represented by the following formula:

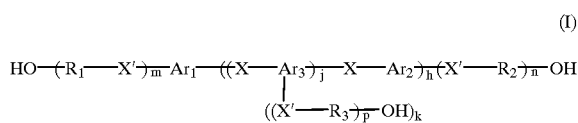

(I)

wherein $Ar_1$, $Ar_2$ and $Ar_3$ each independently represents an aromatic group; $R_1$, $R_2$ and $R_3$ each independently represents a non-aromatic predominantly hydrocarbyl group; each X and X' independently represents a hydrocarbylene group, a hydrocarbylidene group, a divalent hetero atom or group, an ester linkage, or a combination thereof; each X' can also represent a covalent bond; h and k each independently represent an integer equal to 0 or 1; j represents an integer in the range from 0 to 5; and m, n, and p each independently represent an integer in the range from 1 to 5, provided that at least one hydroxy group of formula (I) is a nonprimary hydroxy group. Formula (I) dictates that subscripts j and k are equal to 0 when h is 0.

$Ar_1$, $Ar_2$ and $Ar_3$ are preferably substituted or unsubstituted phenyl groups, more preferably unsubstituted phenyl groups, wherein the substituted phenyl groups are preferably substituted with one or more hydrocarbyl groups, hetero groups and hetero atoms, preferably hydrocarbyl groups. $R_1$, $R_2$ and $R_3$ are preferably aliphatic groups having up to about 12, more preferably up to about 8, and even more preferably up to about 4, carbon atoms. X is preferably a hydrocarbylene or hydrocarbylidene group, even more preferably a nonaromatic hydrocarbylene or hydrocarbylidene group, such as a straight or branched alkylene or alkylidene group, respectively, and even more preferably methylene or an alkylidene group having from 2 to 8 carbon atoms, more preferably from 2 to 4 carbon atoms, such as propylidene. X' is preferably a divalent hetero atom, such as an oxygen atom, or a divalent ether or ester group. When h is 1 and k is 0, X is preferably an alkylidene, more preferably a propylidene, group in which the group is bonded to the rest of the molecule solely at a nonprimary carbon atom. When j is in the range from 1 to 5 and in at least some, preferably all, j units k is 1, X is preferably a methylene group.

In one preferred embodiment, k equals 0. Those aromatic polyols may also be referred to as monoaromatic diols. Preferred monoaromatic diols are represented by the following formula:

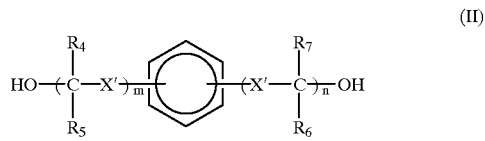

(II)

wherein $R_4$ to $R_7$ each independently represent a hydrogen atom or a hydrocarbyl group, provided that at least one hydroxy group is a nonprimary hydroxy group. The hydrocarbyl group is preferably an aliphatic group having from 1 to 6 carbon atoms, more preferably an alkyl group having from 1 to 3 carbon atoms, and even more preferably a methyl group; X' is as defined above, preferably an ether or ester linkage or a covalent bond; and m and n are integers as defined above, preferably equal to 1. Specific examples of monoaromatic diols include bis-(β-hydroxypropyl) isophthalate, bis-(β-hydroxypropyl)terephthalate, bis-(β-hydroxypropyl)phthalate, tetramethyl 1,4-benzenedimethanol, and tetramethyl 1,3-benzenedimethanol. Monoaromatic diols in which at least one hydroxy group is a nonprimary, more preferably a secondary, hydroxy group are preferred. In some embodiments, those monoaromatic diols in which one hydroxy group is a primary hydroxy group and the other hydroxy group is a nonprimary hydroxy group are even more preferred.

In another preferred embodiment of this invention, the aromatic polyol end-capped polyetherester resin is obtainable by reacting the above-described unsaturated polyetherester resin with an aromatic polyol represented by the formula:

(III)

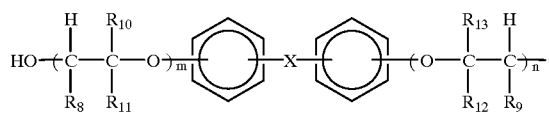

wherein each of $R_8$ to $R_{13}$ represent a hydrogen atom or a predominantly hydrocarbyl group, provided that at least one of $R_8$ and $R_9$ is not an hydrogen atom, and more preferably in some cases one is hydrogen and the other is a predominantly hydrocarbyl group; X represents —C(CH$_3$)$_2$—, —S— or —O—, preferably —C(CH$_3$)$_2$—; and m and n represent integers which individually are in the range from 1 to 5. The predominantly hydrocarbyl group is preferably a methyl group.

Preferred compounds of formula (III) in which m and n are each equal to 1 may be obtained by reacting the appropriate diol compound with the appropriate bisphenol compound under conditions ascertainable by one of the ordinary skill in the field of organic chemistry without undue experimentation. A preferred example of such a reaction is that between propylene glycol and bisphenol A. The product of the latter preferred reaction is commercially available as Dow Resin 565 (The Dow Chemical Company) and also as SYNFAC® 8029 (Millikan & Company).

Preferred compounds of formula (III) in which m and n may be greater than 1 may be obtained by making an adduct of an appropriate bisphenol compound using an appropriate alkylene oxide under conditions ascertainable by one of ordinary skill in the field of polymer chemistry without undue experimentation. A preferred compounds of this type include propylene oxide adducts of bisphenol A, such as UCAR™ Diol 3P, available from Union Carbide Corp. Other examples include Union Carbide's UCAR™ Diol BB-300 and Millikan & Company's SYNFAC® Polyols.

In another preferred embodiment of this invention, the aromatic polyol used to make the end-capped polyetherester resin is at least one compound of formula (I) in which h and k are each equal to 1, and j is in the range from 2 to 5. Such aromatic polyols and how to make them are known in the field of organic chemistry. Examples of such compounds include novolac-type polyols obtainable by alkoxylating a novolac-type resin. A novolac-type resin is defined herein as either (1) a novolac resin produced by reacting phenol or substituted phenols with an aldehyde, such as formaldehyde or (2) resins produced by coupling phenol or substituted phenols with a divinyl linking compound and optionally modifying with mono-styrenics. The first type are old and readily available on the market, and can easily be synthesized by one of ordinary skill in the polymer chemistry field. The second are described in U.S. Pat. No. 5,674,970, which is incorporated herein by reference, and which are commercially available from Georgia-Pacific Resin Co. under the trademark ARYLZENE™. An example is ARYLZENE™ 7040.

Polyols of ARYLZENE™ that are suitable for use as the aromatic polyol reactant for making the aromatic polyol end-capped polyetherester resins of this invention are also commercially available from Georgia-Pacific Resin. An example of such an ARYLZENE™ polyol is ARYLZENE™ 7140 polyol, the result of propoxylation of an ARYLZENE™ resin.

In a preferred embodiment, these aromatic polyols may be represented by the formula:

(IV)

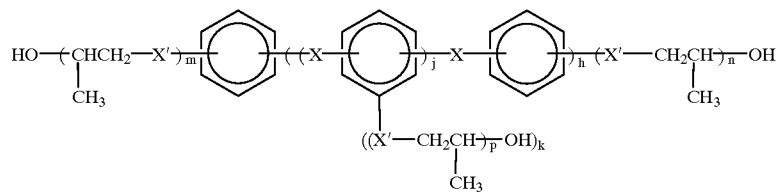

wherein X, X', h, j, k, m, n and p are as previously defined in formula (I) above. In a more preferred embodiment, X represents methylene groups. In an even more preferred embodiment, k is 1 and j is in the range from 1 to 3.

End-capping compounds that may be present in addition to aromatic polyols include, for example, dicyclopentadiene, an epoxy-containing compound, or both dicyclopentadiene and an epoxy-containing compound. The epoxy-containing compound may be selected from those described below in connection with the additional unsaturated polyetherester resin under the subheading "Optional Ingredients".

The aromatic polyol end-capped unsaturated polyetherester resins obtainable according to the above process increase the water and/or chemical resistance of curable thermoset resin compositions to which they are added without decreasing the storage stability of those compositions prior to adding curing agent. Another advantage of the end-capped polyetherester resins according to this invention is that they have the advantage of improving the ease of application of the curable thermoset resin compositions in which they are incorporated and reduce styrene emissions.

The low viscosity of the end-capped resins contributes to the latter advantages. In a preferred embodiment, the end-capped polyetherester resins according to this invention have a viscosity not greater than about 1200 cp (1.200 Pa·s) when the resin is dissolved in 35 wt % styrene based on the total weight of resin and styrene.

Unsaturated Polyester Resins

The unsaturated polyester resins suitable as component (B) of the curable thermoset resin compositions, and intermediate therefore, of this invention are those that are commonly employed to make fiber-reinforced composite materials. They are well known, in that they are described in numerous issued patents, and they are readily available commercially.

Preferably, the unsaturated polyester resin component (B) is a dicyclopentadiene (DCPD) polyester resin obtainable from DCPD, maleic anhydride and a polyhydric alcohol. The polyhydric alcohol is preferably a glycol (e.g., propylene polyhydric alcohol, ethylene polyhydric alcohol, diethylene polyhydric alcohol, dipropylene polyhydric alcohol, or mixtures of these). The reaction is preferably performed in the presence of water under conditions to generate maleic acid from the maleic anhydride so as to form DCPD maleate and then esterifying the maleate with the glycol to form the unsaturated polyester resin. The DCPD polyester resin preferably has a viscosity not greater than about 500 cp (0.50 Pa·s).

The preparation of DCPD polymer resins is described, for example, in U.S. Pat. Nos. 3,933,757; 3,347,806; 3,883,612; 4,029,848; 4,148,765; 4,348,499; and 4,246,367, the teachings of which are incorporated herein by reference.

DCPD polyester resins are typically available as solutions in vinyl aromatic monomers such as styrene. To the extent that the vinyl aromatic monomer is already introduced by the DCPD polyester resin solution, that counts towards the presence of vinyl monomer component (C).

The proportion of DCPD polyester resin to polyetherester resin falls within a weight ratio range of about 10:90 to about 90:10, and preferably within the range from about 25:75 to about 75:25.

Vinyl Aromatic Monomers

The vinyl aromatic monomers useful as component (C) of the curable thermoset resin compositions, and intermediate therefore, of this invention include styrene, vinyl toluene, chlorostyrenes, tert-butylstyrene, dimethylstyrenes, divinylbenzene, diallylphthalate, mono- or multifunctional lower alkyl esters of acrylic and methacrylic acids, and the like, and mixtures thereof. Styrene is preferred. The vinyl aromatic monomer is present in an amount effective to result in a cured thermoset when reacted with the other components of the curable thermoset resin composition in the presence of a free-radical initiator. The amount of vinyl aromatic monomer in the curable thermoset resin composition is in the range from about 10 to about 70 wt. %. Preferably, the vinyl monomer is present in an amount of at least about 20 wt. %, more preferably at least about 30 wt. %, up to about 60 wt. %, more preferably up to about 50 wt. %, and even more preferably up to about 36 wt. %.

Curing Agent

The curing agent useful as component (D) of the curable thermoset resin compositions of this invention comprises at least one free-radical initiator. Useful free-radical initiators are those well known and commercially available in the unsaturated polyester industry. They include peroxide and azo-type initiators. Peroxide initiators include, for example, methylethyl ketone (MEK) peroxide, benzoyl peroxide, tert-butylperbenzoate, terbutylperoxide, and the like, and mixtures thereof. An example of a commercially available initiator is THERMACURE® JTS (a methyl ethyl ketone peroxide available from Cook Composites and Polymers, Inc.). The initiator is used in an amount effective to react the vinyl aromatic monomer and other polymer components of the curable thermoset resin composition to produce a cured thermoset. Typically, the amount is within the range from about 0.5 to about 3 wt. %, more preferably from about 1 to about 2 wt. %, based on the weight of the curable thermoset resin composition.

An accelerator is often combined with the free-radical initiator in the curing agent to allow curing at lower temperatures. Examples of accelerators include dimethylaniline and salts of transition metals (cobalt, iron, manganese, copper, zinc, or vanadium), such as cobalt naphthenate, cobalt octanoate, and the like.

Optional Ingredients

The curable thermoset resin compositions, and intermediates for making them, according to the present invention may contain additional optional ingredients. One of those optional ingredients is at least one aromatic vinyl ester resin. This ingredient may be added to provide further improvements in properties, such as even higher resistance to solvents and chemicals, including resistance to acidic oxidizing environments, and improved strength and toughness at elevated temperatures. Examples of aromatic vinyl ester resins include products obtainable by reacting a vinyl acid, such as acrylic or methacrylic acid, with an epoxy end-capped phenolic compound. The epoxy end-capped phenolic compound is typically an epoxy adduct of bisphenol A or a novolac resin, which are obtainable by reacting the bisphenol A or novolac resin, respectively, with epichlorohydrin. Vinyl ester resins and how to make them are described in U.S. Pat. No. 4,525,544, which is incorporated herein by reference.

Such aromatic vinyl esters are commercially available from The Dow Chemical Company under the trademark DERAKANE™. An example of an aromatic vinyl ester resin which is derived from an epoxy end-capped bisphenol A is DERAKANE™ 411. Aromatic vinyl ester resins derived from epoxy end-capped novolac resins are designated DERAKANE™ 470.

The curable thermoset compositions and intermediates for making them, in this invention, may also further comprise as additional optional ingredients at least one unsaturated polyetherester resin other than the unsaturated polyetherester resin (A) of the invention already defined. This additional unsaturated polyetherester resin may be end-capped with at least one end-capping compound selected from the group consisting of dicyclopentadiene, an epoxy-containing compound, or both dicyclopentadiene and an epoxy-containing compound.

The epoxy group-containing compound may be represented by the following formula:

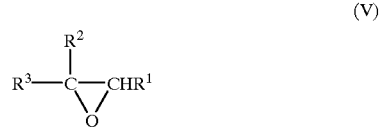

(V)

wherein $R^1$, $R^2$ and $R^3$ represent a hydrogen atom or a hydrocarbyl group optionally having one or more hetero atoms, provided that at least one of $R^1$, $R^2$, and $R^3$ is not a hydrogen atom. The hydrocarbyl group may be methyl, aliphatic, cycloaliphatic, or aromatic, combinations of two or more of methyl, aliphatic, cycloaliphatic and aromatic moieties, with or without hetero atoms. The hetero atoms may, for example, be oxygen or sulfur atoms present as ether or ester linkages between two or more methyl, aliphatic, cycloaliphatic, or aromatic moieties and/or the hetero atoms may be present in functional groups, such as additional groups of formula (V). The hydrocarbyl group preferably does not contain functional groups reactive with the epoxy group on formula (V). Preferably, the epoxy-containing compound has at least two hydrocarbyl groups that do not contain moities reactive with the polyetherester resin (A).

The number average molecular weight of the epoxy-containing compound is preferably no greater than 1500, preferably no greater than about 1000, and even more preferably no greater than 500. The epoxy group-containing compounds include, for example, glycidyl esters, glycidyl ethers, epoxy alkyls, epoxy cycloalkyls, epoxyalkylenes, aromatic epoxy compounds, such as p-glycidyl-styrenes, and the like, and mixtures thereof. Specific examples of the epoxy group-containing compounds include CARDURA® Resins (glycidyl esters available from the Shell Oil Company) such as CARDURA® E-10 Resin (a glycidyl ester of Versatic™ 10 Acid; GLYDEXX® available from Exxon Chemical Co., such as GLYDEXX® N-10 or ND-101; etc.

Suitable aromatic epoxy compounds include glycidyl ethers obtainable by the reaction of epichlorohydrin with an aromatic compound containing at least one hydroxyl group carried out under alkaline reaction conditions. The epoxy-containing compounds obtained when the hydroxyl group-containing compound is 2,2-bis(4-hydroxy-phenylpropane) (i.e., bisphenol-A) are represented by the structure below wherein n is zero or a number greater than 0, commonly in the range of 0 to 10, preferably in the range of % and preferably less than or equal to about 80 wt. %, DCPD and/or monofunctional epoxy-containing compound, which may be obtainable by reacting the same with the unsaturated polyetherester resin in the corresponding proportions. In one embodiment, the at least one end-capping compound comprises a mixture of (a) DCPD and/or monofunctional epoxy-containing compound and (b) a di-or polyfunctional epoxy-containing compound, preferably wherein the ratio of (a) to (b) is in the range from about 10:90 to about 90:10, more preferably from about 20:80 to about 80:20.

Further components may be added to the curable thermoset resin compositions of this invention. Such components include reinforcing agents such as fibers, for example glass, fibers or organic fibers, which may be in chopped form or in the form of a fabric or mat; fire retardants (phosphorous or antimony compounds, aluminum trihydrate, halogenated waxes, etc.), antioxidants, free radical initiator inhibitors (e.g., to prevent premature initiation of polymerization), pigments, colorants, mold release agents, inert fillers (calcium carbonate, clays, talc, etc.), low-profile or low-shrink additives, thickeners (magnesium oxide, magnesium hydorxide, calcium oxide, etc.), etc. When reinforcing fiber is used, the amount of fiber is preferably at least 5 wt. %, more preferably at least about 10 wt. %, up to about 80 wt. %, more preferably up to about 60 wt. %, of the total weight of the composition.

Utility of the Curable Thermoset Resin Composition

The curable thermoset resin compositions of this invention, when combined with a reinforcing fiber may be used to obtain a fiber-reinforced polymer composite by curing the thermoset resin composition.

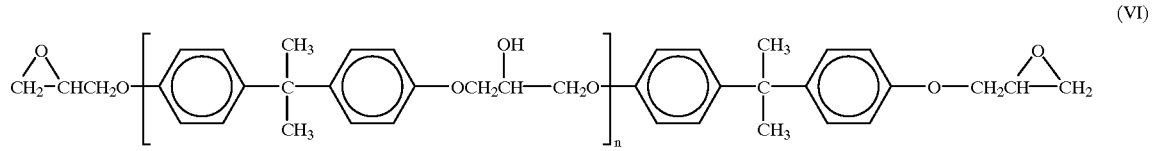

(VI)

Other suitable epoxy compounds can be prepared by the reaction of epichlorohydrin with mononuclear di- and tri-hydroxy phenolic compounds such as resorcinol and phloroglucinol, selected polynuclear polyhydroxy phenolic compounds such as bis(p-hydroxyphenyl) methane and 4,4'-dihydroxybiphenyl, or aliphatic polyols such as 1,4-butanediol and glycerol.

Preferred diepoxy compounds include those designated EPON® Resin commercially available from the Shell Oil Company, such as EPON® Resins 825, 826 and 828, each of which are reaction products of epichlorohydrin and bisphenol A in which the n value of the above formula is 0.04, 0.08 and 0.13, respectively. The commercially-available epoxy resin EPON® Resin 828 having a molecular weight of about 400 and an epoxide equivalent (ASTM D-1652) of about 185–192, is a preferred diepoxy compound because of its low viscosity, mechanical performance and commercial availability.

Additional examples of suitable bisphenol-A type epoxy compounds include the D.E.R.™ resins available from The Dow Chemical Company, such as D.E.R.™ 330, 331, 332 and 383 and the ARALDITE™ GY resins available from Ciby-Geigy such as ARALDITE™ GY 6004, 6005, 6008, 6010 and 2600.

In a preferred embodiment, the at least one end-capping compound comprises at least some, more preferably at least about 20 wt. %, even more preferably at least about 50 wt.

The curable thermoset resin composition of this invention may also be used to prepare an intermediate for making a skin laminate by combining the curable thermoset resin composition with reinforcing fibers in the form of a sheet preferably having an average cross-sectional thickness of at least about 10 mil (0.25 mm), more preferably from about 20 mil (0.5 mm) up to about 200 mil (5 mm), more preferably up to 100 mil (22.5 mm), even more preferably up to 30 mil (0.8 mm). The fiber content of the skin laminate is preferably in the range from about 25 to about 45 wt. %. The fiber is preferably about 0.5 inch to about 2 inch (about 1 to about 5 cm) chopped fiber or a shear of a continuous strand fiber mat. The skin laminate intermediate may be used between a gel coat layer and a fiber-reinforced polymer layer in a gel coated polymer laminate to improve water and/or chemical resistance and also to improve the surface appearance of the laminate.

Water and/or chemical resistance of the gel coated polymer laminate may also be improved by interposing just the curable thermoset resin composition, with or without optional components, between the gel coat layer and the fiber-reinforced polymer layer.

An advantage of interposing the thermoset resin of the present invention between a gel coat layer and the fiber-reinforced polymer layer is the prevention, or minimization, of blistering due to the migration of water and/or other low molecular weight substances, such as organic solvents, through the gel coat into the fiber-reinforced polymer, causing swelling, delamination, and other problems in the fiber-reinforced polymer layer. The swelling can cause a blister under the gel coat and continued migration of water and/or other solvents into the fiber-reinforced polymer can eventually lead to loss of strength in the fiber-reinforced polymer laminate.

In one embodiment, blistering of a gel coated fiber-reinforced polymer is reduced by applying at least one layer of the curable thermoset resin composition or the skin laminate intermediate between the gel coat layer and the fiber-reinforced polymer layer and curing the curable thermoset resin composition. Preferably, this is carried out by applying a gel coat composition to a mold, at least partially curing the gel coat composition, applying at least one curable thermoset resin composition or the skin laminate intermediate to the at least partially cured gel coat, at least partially curing the curable thermoset resin composition, applying at least one fiber-reinforced polymer layer to the at least partially cured thermoset resin composition layer, and curing the resulting product to form the gel coated fiber-reinforced polymer.

The polyester resin used to make the fiber-reinforced polyester resin may be any general purpose polyester resin known in the art, such as orthophthalic acid-based polyester resins. Preferred polyester resins are those with a molecular weight/double bond or vinyl group (—C=C—) factor between about 150 and about 500, more preferably between about 200 and about 350 (as further described in U.S. Pat. Nos. 3,701,748; 4,295,907; and 5,637,630 which are incorporated herein by reference). These resins are made from a reaction of one of more glycols with an unsaturated dicarboxylic acid or its anhydride or with a mixture of the unsaturated acid or its anhydride with a saturated dicarboxylic acid or its anhydride. The reaction mixture may also include dicyclopentadiene to control the molecular weight of the polyesters as described in U.S. Pat. Nos. 3,883,612 and 3,986,922, which are incorporated herein by reference. The unsaturated polyester resin typically has a number average molecular weight in the range from about 500 to about 5,000, preferably in the range from about 700 to about 2,000. Examples of suitable unsaturated polyester resins include the STYPOL® polyester resins made by Cook Composites & Polymers, Inc. The polyester resin is applied as a matrix precursor and then cured, for example, by using a curing agent described above for the polyetherester resin.

The gel coat composition may be any of those that are well known and available in the art. The gel coat is typically 10 to 25 mils (0.2 to 0.6 mm) in thickness, and is the surface coating of the molded part. The gel coat provides the finishing color and surface profile of the part. Gel coats are well known and various grades are commercially available. The selection of gel coat will depend upon the desired characteristics of the part relative to, among other things, weatherability, hydrolytic stability, and surface finishing. Examples of commercially available gel coat materials include gel coat materials available from Cook Composites and Polymers under the marks POLYCOR®, ARMORCOTE®, BUFFBACK®, ENVIROCOR®, and LOVOCOR®.

Examples of the various types of reinforcement fibers that can be used in the practice of this invention are glass fibers, carbon fibers, various aramid fibers, and other types of natural and synthetic fibers. The typical fiber content of the composite is between about 10 and 80 percent by weight.

The composite and the molded part can, and often are, constructed in one operation. First, a gel coat is usually applied to the surface of the mold, at least partially cured, and then a skin laminate is applied over the at least partially cured gel coat. These are open mold operations. Then the fiber-reinforced polyester matrix precursor is applied, for example, by hand lay-up or spray-up, or the fiber reinforcement is applied to the skin laminate, the mold is closed, and the polyester matrix precursor is injected into the closed mold, preferably with the closed mold under vacuum. The precursor is then allowed to cure, with or without a heat supplement, and the part or article demolded.

EXAMPLES

Resin A

Resin A is an end-capped unsaturated polyetherester resin according to this invention blended with styrene monomer. The unsaturated polyetherester resin is prepared by charging a 5 liter flask, equipped with an agitator, condenser, thermometer and sparge tube for introducing nitrogen gas, with 1,050 grams ACCLAIM™ Polyol 2200 (a 2000 MW polyoxypropylene diol available from ARCO Chemical Co.), 395 grams propylene glycol, 1020 grams maleic anhydride and 2.3 grams p-toluenesulfonic acid monohydrate and heating the mixture to 195 C for 4 hours while introducing nitrogen gas until the acid number drops to 110 mg KOH/g. End-capping is conducted by reducing the temperature of the reaction mixture to 150 C, introducing 760 g bis-(β-hydroxypropyl)isophthalate to the resulting mixture, and raising the temperature back to 195 C, where it is maintained until the acid number is reduced to 30 mg KOH/g. The reaction product is blended with 1750 g styrene monomer to form about 5,000 g of a clear resin solution containing the end-capped resin (Resin A) having a viscosity of 400 cp (0.400 Pa·s) and 65 wt. % NVM.

Resin B

Resin B is also an end-capped unsaturated polyetherester resin according to this invention blended with styrene monomer. The end-capped unsaturated polyetherester resin is prepared the same way as that of Resin A, except that 760 g Dow Resin 565 (2,2-bis(4-(β-hydroxypropoxy) phenylpropane) commercially available from The Dow Chemical Co.) is added instead of 760 g bis-(β-hydroxypropyl)isophthalate as the end-capping reagent. The resulting end-capped unsaturated polyetherester resin (Resin B) blended with styrene monomer has a viscosity of 500 cp (0.500 Pa·s) and 65 wt. % NVM.

Resin C

Resin C is another end-capped unsaturated polyetherester resin according to this invention blended with styrene monomer. The end-capped unsaturated polyetherester resin is prepared the same way as that of resin A, except that 760 g of ARYLZENE 7140 (a propoxylated product of aralkylation of compounds containing phenolic hydroxyls commercially available from Georgia-Pacific Resin Company). The resulting end-capped unsaturated polyetherester resin (Resin C) blended with styrene monomer has a viscosity of 500 cp (0.500 Pa.s) and 65 wt. % NVM.

Resin D (Comparative)

Resin D is an epoxy end-capped unsaturated polyetherester resin blended with styrene monomer used for the comparative examples which follow. This unsaturated polyetherester resin is prepared by charging a 5 liter flask, equipped with an agitator, condenser, thermometer and sparge tube for introducing nitrogen gas, with 1418 grams ACCLAIM™ Polyol 2200 (a 2000 MW polyoxypropylene diol available from ARCO Chemical Co.), 442 grams propylene glycol, 1140 grams maleic anhydride and 2.3 grams p-toluenesulfonic acid monohydrate and heating the mixture to 195 C for 4 hours while introducing nitrogen gas until the acid number drops to 110 mg KOH/g. End-capping is conducted by reducing the temperature of the reaction mixture to 140 C, introducing 260 g DCPD dropwise to the resulting mixture, and maintaining the 140 C temperature for 4 hours until the acid number is reduced to about 84 mg KOH/g. The mixture is then charged with 0.7 g DMP-30 (2,4,6-trisdimethylaminomethylphenol), mixed and maintained at 140 C for 5 minutes, after which 675 g EPONO Resin 828 (available from the Shell Oil Co.) is added, the reaction mixture continues to be mixed and is maintained at a temperature of 140–150 C until the acid number drops to 30 mg KOH/g. The reaction product is blended with 1500 g styrene monomer to form about 5,000 g of a clear resin solution containing the end-capped resin (Resin D) having a viscosity of 1100 cp (1.100 Pa·s) and 65 wt. % NVM.

Resin E (Comparative)

Resin E is a propylene glycol end-capped unsaturated polyetherester resin blended with styrene monomer for use in a comparative example described below. The unsaturated polyetherester resin is prepared by charging a two liter resin kettle, equipped with a mechanical stirrer, nitrogen sparge tube, thermocouple, and distillation head, with 975 g ARCOL™ LG56 (a polyoxypropylene triol having a molecular weight of about 3000 available from ARCO Chemical Co.), 525 g maleic anhydride, and 1.5 g p-toluenesulfonic acid, and heating the mixture to 55 C until a homogeneous solution results. 152 g water is then added and the mixture is stirred until the exotherm from the hydrolysis reaction of maleic anhydride and water dissipates. The temperature of the mixture is then gradually increased to 185 C and the mixture is held at that temperature until the acid number drops to 138 mg KOH/g. 243 g propylene glycol is added and heating is continued until the acid number is reduced to 53 mg KOH/g. After vacuum stripping, a clear, nearly water-white, resin results (Resin E). This resin is blended with styrene to form a mixture having 65 wt. % NVM.

DCPD Resin

DCPD resin is a DCPD unsaturated polyester resin blended with styrene. The DCPD unsaturated polyester resin is prepared by charging a 4 liter resin kettle, equipped with a mechanical stirrer, nitrogen sparge tube, thermocouple (for measuring temperature), and a distillation head, with 1032 g maleic anhydride, heating the maleic anhydride to 150 F (66 C), slowly adding about 207 g water to the maleic anhydride and allow the temperature to rise to about 245 F (118 C) due to the heat given off by the exothermic reaction between the maleic anhydride and the added water, and then, when the temperature begins to drop of its own accord, adding 1392 g DCPD at a rate that maintains the temperature of the reactants between about 245 and 265 F (between about 118 C and 129 C) until the acid number of the reaction mixture is 245 KOH/g or less. Then 415 g of ethylene glycol are added to the resulting reaction mixture and the temperature of the reaction mixture is raised to 400 F (204 C) and maintained at about that temperature until the acid number drops to 42 KOH/g. A vacuum (i.e., negative pressure differential) of 25 inches Hg (85 kPa) is applied to the mixture for about 30 minutes as the reaction temperature is allowed to cool. The reaction product is then blended with 1200 g styrene.

Preparation of the Curable Thermoset Resins

Resins A, B, D and E are each combined with the above described DCPD Resin in the proportions shown in Table 1 below to make Examples 1–3 of this invention and comparative Examples C-1 and C-2. A catalyst system is added to cure each example at room temperature, which consists of 1.25 wt. % THERMACURE® JTS (a methyl ethyl ketone peroxide available from Cook Composites and Polymers, Inc.), 0.15 wt. % cobalt naphthenate, and 0.12 wt. % N,N-dimethylacetoacetamide. The results obtained are shown in Table 1 below.

TABLE 1

Result of Curing Examples 1–3 of the Invention and Comparative Examples C-1 and C-2

| Component/Property | Ex. 1 | Ex. 2 | C-1 | C-2 | Ex. 3 |
|---|---|---|---|---|---|
| DCPD Resin (g) | 70 | 70 | 70 | 70 | 50 |
| Resin A (g) | 30 | — | — | — | 35 |
| Resin B (g) | — | 30 | — | — | — |
| Resin D (g) | — | — | 30 | — | — |
| Resin E (g) | — | — | — | 30 | — |
| Derakane 470-36 VE (g) | — | — | — | — | 15 |
| NVM (wt. %) | 65 | 65 | 65 | 65 | 65 |
| Viscosity (cp) | 241 | 281 | 340 | 200 | 310 |
| Gel Time (min.) | 25.0 | 20.4 | 21.9 | 21.5 | 23.6 |
| Gel to Peak Exotherm (min.) | 11.1 | 9.8 | 10.7 | 9.8 | 10.9 |
| Maximum Exotherm (F) | 344 | 349 | 355 | 359 | 350 |
| HDT (F) | 204 | 216 | 204 | 211 | 231 |

Gel time and viscosity of these compositions when they are stored for various periods of time prior to adding the crosslinking agent is shown below in Table 2.

TABLE 2

Stability of Gel Time and Viscosity During Storage

|  | Resin B | Resin D | Resin E |
|---|---|---|---|
| Gel Time (min.) |  |  |  |
| 0 day | 21.0 | 21.5 | 20.5 |
| 15 days | 23.0 | 31.0 | 22.5 |
| 30 days | 26.0 | 34.0 | 23.0 |
| Viscosity (cp) |  |  |  |
| 0 day | 450 | 1020 | 400 |
| 15 days | 510 | 1150 | 420 |
| 30 days | 500 | 1320 | 410 |

As can be seen from Table 2, the storage stability of Resin B according to this invention is substantially greater than the storage stability of comparative epoxy end-capped Resin D and roughly the same as the storage stability of comparative Resin E.

Gel coated laminates are prepared by spraying a full ISO/NPG type of gel coat on a glass mold, drawing down the gel coat to 23 and 48 mil (0.58 and 1.22 mm) "wet" thickness, and then letting the gel coat cure for 1 hour at ambient temperature. A skin laminate is applied to the gel coat consisting of 2 plies of 1.5 ounce (42.5g) fiberglass mat saturated with one of Examples 1–3 and Comparative Examples C-1 and C-2 of Table 1, such that each skin laminate had a 30 wt. % glass content. The cure time for skin laminate is 2 hours at ambient temperature. The main laminate consisting of 4 plies of 1.5 ounce (42.5g) fiberglass mats with 30 wt. % glass content is applied after the skin laminate. A typical marine grade laminate resin, STYPOL® 40-4822, is used. The laminate is cured at ambient temperature for at least 16 hours before the water boil test was performed. Table 3 shows the surface profile ratings. (Based on ACT™ Orange Peel Standards).

TABLE 3

Surface Rating of Gel Coated Laminates

|  | Ex. 1 | Ex. 2 | C-1 | C-2 | Ex. 3 |
|---|---|---|---|---|---|
| Initial (thin): | | | | | |
| Longwave, mean | 10.7 | 8.7 | 8.5 | 8.8 | 8.1 |
| Shortwave, mean | 7.8 | 5.4 | 9.2 | 8.9 | 5.4 |
| Rating, mean | 6.7 | 7.2 | 7.3 | 7.1 | 7.4 |
| Initial (thick): | | | | | |
| Longwave, mean | 2.1 | 2.8 | 2.1 | 1.9 | 1.4 |
| Shortwave, mean | 5.7 | 5.7 | 4.7 | 3.1 | 3.6 |
| Rating, mean | 10.2 | 9.6 | 10.3 | 10.4 | 10.5 |

The waviness rating values (ACT™ Orange Peel Standards) are typical industry visual test methods used to describe the surface appearance of an object. A BYK-Gardner wave-scan is used to measure the surface appearance of various test panels. The wave-scan can report the results in both long-term (structure size greater than 0.6 mm) and short-term waviness (structure size less than 0.6 mm). Both long-term and short-term waviness are rated from 0 to 100. The higher the number, the more waviness is observed. The long-term and short-term waviness are then mathematically correlated to a surface rating value from 0 to 10. The higher the number, the smoother the surface appears. As can be seen from Table 3, the surface ratings are similar between the examples according to this invention and the comparative examples.

The gel coated laminates described above are then exposed to boiling water for 100 hours and then the surface profiles are rated according to a procedure which generates an "ANSI Rating". The "ANSI Rating" refers to a surface profile test described in the publication ANSIZ124.1-1987 section 6.3 issued by ANSI (the American National Standards Institute). A lower ANSI rating indicates better surface profile. An ANSI rating greater than 9 is considered failure.

TABLE 4

ANSI Ratings for Panels Exposed to Boiling Water for 100 Hours

|  | Ex. 1 | Ex. 2 | C-1 | C-2 | Ex. 3 |
|---|---|---|---|---|---|
| ANSI Rating (thin) | 6.1 | 6.2 | 6.7 | 8.0 | 5.9 |
| ANSI Rating (thick) | 3.1 | 3.8 | 4.0 | 4.7 | 3.9 |

As shown by Table 4, the panels according to this invention have water resistance at least as good as the comparative examples when the gel coat is thick, and show improved water resistance when the gel coat is thin, which is when the laminate is most prone to surface profile deterioration.

The preceding examples are for illustrative purposes only. They are not to be construed as a limitation upon the invention as described in the following claims.

What is claimed is:

1. A process for making an unsaturated polyetherester resin useful for making curable thermoset resin compositions comprising reacting at least one acid-terminated unsaturated polyetherester resin with at least one aromatic polyol having at least one non-primary hydroxy group to produce an unsaturated polyetherester resin at least partially end-capped with an aromatic polyol;

wherein the at least one aromatic polyol is represented by the formula

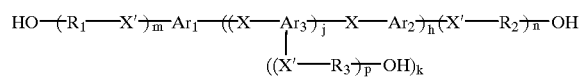

wherein $Ar_1$, $Ar_2$ and $Ar_3$ each independently represents an aromatic group; $R_1$, $R_2$, and $R_3$ each independently represents a non-aromatic predominantly hydrocarbyl group; each X and X' independently represents a hydrocarbylene group, a hydrocarbylidene group a divalent hetero atom or group, an ester linkage, or a combination thereof; each X can also represent a covalent bond, h and k each independently represent an integer equal to 0 or 1; j represents an integer in the range from 0 to 5; and m, n, and p each independently represent an integer in the range from 1 to 5, provided that at least one hydroxy group of formula (I) is a nonprimary hydroxy group.

2. The process according to claim 1 wherein the at least one aromatic polyol further comprises at least one primary hydroxy group.

3. The process according to claim 1, wherein $Ar_1$, and $Ar_2$ and $Ar_3$ when present, each represent a phenylene ring.

4. The process according to claim 1, wherein each X, when present, represents a hydrocarbylene or hydrocarbylidene group and each X' represents a hetero atom.

5. The process according to claim 1, wherein h is 0.

6. The process according to claim 5 wherein the aromatic polyol is represented by the formula:

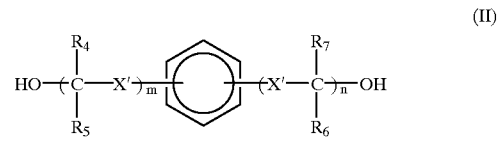

wherein $R_4$ to $R_7$ each independently represent a hydrogen atom or a hydrocarbyl group, provided that at least one hydroxy group is a nonprimary hydroxy group.

7. The process according to claim 1, wherein h is 1.

8. The process according to claim 7 wherein the aromatic polyol is represented by the formula:

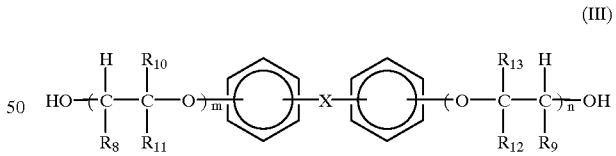

wherein each of $R_8$ to $R_{13}$ represent a hydrogen atom or a predominantly hydrocarbyl group, provided that at least one of $R_8$ and $R_9$ is not an hydrogen atom, X represents —C(CH$_3$)$_2$—, —S— or —O—, and m and n represent integers which individually are in the range from 1 to 5.

9. The process according to claim 8 wherein the aromatic polyol is a propylene oxide adduct of bisphenol A.

10. The process according to claim 1, wherein h is 1 and j is in the range from 1 to 5.

11. The process according to claim 10 wherein X is a methylene, alkylene or alkylidene group.

12. The process according to claim 10, wherein the aromatic polyol is obtainable by alkoxylating a novolac-type polymer.

13. The process according to claim 12 wherein the aromatic polyol is obtained by propoxylating a novolac-type polymer.

14. The process according to claim 1, wherein the at least one acid-terminated unsaturated polyetherester is prepared by reacting at least one polyether and at least one ethylenically unsaturated anhydride or dicarboxylic acid in the presence of at least one catalyst effective to promote insertion of the anhydride or dicarboxylic acid into carbon-oxygen bonds of the polyether to produce unsaturated polyetherester resin polymer chains.

15. The process according to claim 14, wherein the polyether is a polyether glycol having an average hydroxyl functionality of about 2 to about 6, a hydroxyl number of about 28 to about 260 mg KOH/g, and a number average molecular weight of about 400 to about 12,000.

16. The process according to claim 15, wherein the at least one aromatic polyol further comprises at least one primary hydroxy group and is represented by the formula:

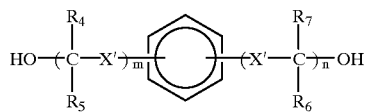

(II)

wherein $R_4$ to $R_7$ each independently represent a hydrogen atom or a hydrocarbyl group, provided that at least one hydroxy group is a nonprimary hydroxy group, or

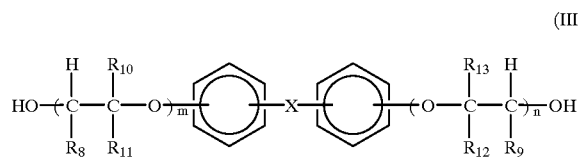

(III)

wherein each of $R_8$ to $R_{13}$ represent a hydrogen atom or a predominantly hydrocarbyl group, provided that at least one of $R_8$ and $R_9$ is not an hydrogen atom, X represents $-C(CH_3)_2-$, $-S-$ or $-O-$, and m and n represent integers which individually are in the range from 1 to 5, or comprises an aromatic polyol prepared by alkoxylating a novolac-type polymer.

17. An unsaturated polyetherester resin at least partially end-capped with an aromatic polyol prepared according to the method of claim 16.

18. An unsaturated polyetherester resin at least partially end-capped with an aromatic polyol prepared according to the method of claim 1.

* * * * *

UNITED STATES PATENT AND TRADEMARK OFFICE
CERTIFICATE OF CORRECTION

PATENT NO. : 6,211,305 B1
DATED : April 3, 2001
INVENTOR(S) : Chih-Pin Hsu, et al.

Page 1 of 1

It is certified that error appears in the above-identified patent and that said Letters Patent is hereby corrected as shown below:

Column 11,
Line 31, add -- 0 to 2 -- after "preferably in the range of ".

Column 15,
Line 8, replace "EPONO" with -- EPON® --.

Column 18,
Line 14, replace "X" with -- X' --; and replace "bond," with -- bond; --.

Signed and Sealed this

Sixteenth Day of October, 2001

Attest:

NICHOLAS P. GODICI
Attesting Officer
Acting Director of the United States Patent and Trademark Office